(12) United States Patent
Boghossian

(10) Patent No.: US 8,143,345 B2
(45) Date of Patent: Mar. 27, 2012

(54) WATER DISPERSIBLE, HYDROXYL-TERMINATED, FLUORINATED POLYURETHANES AND METHOD OF PREPARING THE SAME

(75) Inventor: Razmik Boghossian, Porter Ranch, CA (US)

(73) Assignee: PRC DeSoto International, Inc., Sylmar, CA (US)

(*) Notice: Subject to any disclaimer, the term of this patent is extended or adjusted under 35 U.S.C. 154(b) by 335 days.

(21) Appl. No.: 12/329,886

(22) Filed: Dec. 8, 2008

(65) Prior Publication Data

US 2009/0149596 A1 Jun. 11, 2009

Related U.S. Application Data

(60) Provisional application No. 60/992,835, filed on Dec. 6, 2007.

(51) Int. Cl.

| | | |
|---|---|---|
| C08G 18/00 | (2006.01) | |
| C08G 18/08 | (2006.01) | |
| C08G 18/10 | (2006.01) | |
| C08G 18/28 | (2006.01) | |
| C08G 18/30 | (2006.01) | |
| C08G 18/70 | (2006.01) | |
| C08J 3/00 | (2006.01) | |
| C08K 3/20 | (2006.01) | |
| C08L 75/00 | (2006.01) | |

(52) U.S. Cl. ........ 524/591; 524/589; 524/590; 524/839; 524/840; 528/44; 528/60; 528/65; 528/67; 528/70; 528/76; 528/77; 528/85

(58) Field of Classification Search .................. 524/589, 524/590, 591, 839, 840; 528/44, 60, 65, 528/67, 70, 76, 77, 85
See application file for complete search history.

(56) References Cited

U.S. PATENT DOCUMENTS

| | | | |
|---|---|---|---|
| 4,913,972 A | 4/1990 | Grunewalder et al. | 428/425.5 |
| 6,174,956 B1 * | 1/2001 | Kerschner et al. | 524/591 |

* cited by examiner

Primary Examiner — Patrick Niland
(74) Attorney, Agent, or Firm — Donald R. Palladino

(57) ABSTRACT

Fluorinated polyurethanes and methods of making the same are provided. The fluorinated polyurethanes are useful for making polyurethane coating compositions for use in aerospace and other applications. The method includes a "split process" by which a hydroxypolyalkylenoxy derivative of a perfluoropolyoxyalkane is separately reacted with isocyanate to produce an isocyanate-terminated compound. The isocyanate-terminated compound is then reacted with an emulsifier to produce an acid- and hydroxyl-functional compound. The acid- and hydroxyl-functional compound is then reacted with isocyanate to form an acid-functional, isocyanate-terminated compound. The acid-functional, isocyanate-terminated compound is then reacted with at least one polyol to produce a higher molecular weight, acid- and hydroxyl-functional compound. Finally, the acid functional groups of the high molecular weight, acid- and hydroxyl-functional compound are neutralized to form a fluoro-urethane salt which is dispersed in water. The resulting fluorinated polyurethane can be used to prepare a polyurethane coating composition.

18 Claims, No Drawings

WATER DISPERSIBLE, HYDROXYL-TERMINATED, FLUORINATED POLYURETHANES AND METHOD OF PREPARING THE SAME

CROSS-REFERENCE TO RELATED APPLICATION(S)

This application claims priority to and the benefit of U.S. Provisional Application Ser. No. 60/992,835, filed Dec. 6, 2007 and titled, "WATER DISPERSIBLE HYDROXYL-TERMINATED FLUORO-URETHANE COMPOUNDS AND METHOD OF PREPARING THE SAME," the entire content of which is incorporated herein by reference.

FIELD OF THE INVENTION

The invention is directed to water dispersible fluorinated polyurethanes useful in the preparation of coatings for use in aerospace and other applications. In addition, the invention is directed to methods of preparing the fluorinated polyurethanes.

BACKGROUND OF THE INVENTION

Recently, water-borne polyurethane coating compositions have been developed in an effort to reduce atmospheric pollution caused by organic solvents, including volatile organic compounds ("VOC"s) and hazardous air pollutants ("HAP"s), which have come under strict environmental regulations. In addition to reducing VOCs and HAPs in the coating compositions, efforts have been made to optimize the performance characteristics of water-borne polyurethane coatings. To that end, attempts have been made to use fluorinated diols and polyols in the preparation of pre-polymers for mixture with isocyanate to yield fluorinated polyurethane coating compositions. The fluorine atoms in the resulting coating compositions have unique rotation patterns that serve to prevent penetration of foreign substances to the carbon backbones of the polymers, making it easy to keep the coatings looking clean. For example, because the fluorine atoms prevent foreign substances from accessing the carbon backbone, substances such as graffiti may be easily washed away with water.

Given the desirability of fluorinated coating compositions and the need to reduce VOCs and HAPs, efforts have been made to prepare fluorinated water-borne polyurethane coating compositions. Anionic polyurethane dispersions, for example, are typically prepared by first synthesizing an isocyanate-terminated pre-polymer. This process yields an isocyanate-terminated pre-polymer which can be neutralized with tertiary amines followed by dispersion in water and chain extension, yielding a high molecular weight polyurethane dispersion. However, the batch process yields a polyol dispersion having poor stability and produces a very low yield of the desired fluorinated pre-polymer. This is because the isocyanate reacts not only with the fluorinated diol, but also with the polyether or polyester polyol and the emulsifier. In fact, the isocyanate does not react well with the fluorinated diol or polyol at all, but instead reacts with the emulsifier and the polyether or polyester polyol, due to the hydrophobicity of the fluorinated diol or polyol. The lack of reaction between the fluorinated diol or polyol and the isocyanate causes the fluorinated diol to phase separate out of the polyurethane dispersion over time. Indeed, the fluorinated diol typically separates from the dispersion overnight.

In addition to low yield of the intended high molecular weight fluorinated pre-polymer and the low reactivity (or rate of reaction) of the isocyanate with the fluorinated diol or polyols, the batch process prepares polymers (or species) with unpredictable chemical structures. Because the isocyanate reacts with OH groups randomly, and because the fluorinated diols or polyols, the internal emulsifier, and the polyether or polyester polyols all have multiple OH functionality, it is very difficult to predict with which OH groups the isocyanate will react and in which order. Therefore, the batch process produces an unlimited number of reaction products with different statistical distributions of the reactants. Achieving greater control in polymer synthesis would be desirable.

SUMMARY OF THE INVENTION

The invention is directed to fluorinated polyurethanes and methods of making the same. In addition, the invention is directed to the polyurethane coating compositions including the fluorinated polyurethanes.

According to one aspect of the invention, a method of preparing a fluorinated polyurethane includes a "split process" by which a hydroxypolyalkylenoxy derivative of a perfluoropolyoxyalkane is reacted with a first isocyanate to produce an isocyanate-terminated compound. The isocyanate-terminated compound is then reacted with an emulsifier to produce an acid- and hydroxyl-functional compound. The acid- and hydroxyl-functional compound is then reacted with a second isocyanate to form an acid-functional, isocyanate-terminated compound. The acid-functional, isocyanate-terminated compound is then reacted with at least one polyol to produce an OH-terminated, high molecular weight, acid- and hydroxyl-functional compound. Finally, the acid functional groups of the high molecular weight, acid- and hydroxyl-functional compound are neutralized to form a fluoro-urethane salt which is dispersed in water. The inventive fluorinated polyurethanes are used to prepare polyurethane coating compositions.

In one embodiment of the invention, the hydroxypolyalkylenoxy derivative of a perfluoropolyoxyalkane has the formula (1), where the perfluoropolyoxyalkyl group X has the formula (1A); and is reacted with a first isocyanate to form an isocyanate-terminated compound having the formula (2). In one exemplary embodiment, the first isocyanate is a diisocyanate represented by OCN—R—NCO, in which R is selected from aliphatic groups, cycloaliphatic groups, aromatic groups, and mixtures thereof. Mixtures of isocyanates may also be used. However, using a mixture of isocyanates will lessen the predictability of the resulting chemical structure.

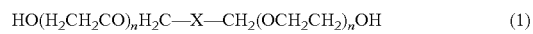

$$HO(H_2CH_2CO)_nH_2C\text{—}X\text{—}CH_2(OCH_2CH_2)_nOH \quad (1)$$

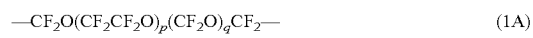

$$\text{—}CF_2O(CF_2CF_2O)_p(CF_2O)_qCF_2\text{—} \quad (1A)$$

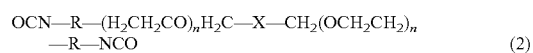

$$OCN\text{—}R\text{—}(H_2CH_2CO)_nH_2C\text{—}X\text{—}CH_2(OCH_2CH_2)_n\text{—}R\text{—}NCO \quad (2)$$

The isocyanate-terminated compound (2) is reacted with an emulsifier represented by the formula (3A) to form an acid- and hydroxyl-functional compound represented by the formula (4). The emulsifier is represented by Formula 3A, in which $R_1$ is an alkyl group.

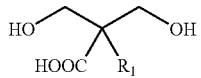

(3A)

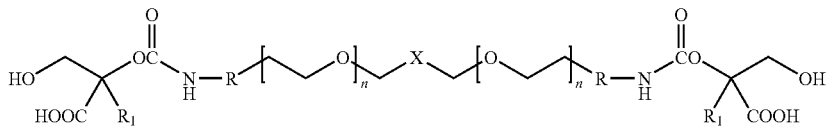

(4)

The acid- and hydroxyl-functional compound (4) is reacted with a second isocyanate to form an acid-functional, isocyanate-terminated compound represented by the formula (5). In one embodiment, the second isocyanate is a diisocyanate represented by OCN—$R_2$—NCO, in which $R_2$ is selected from aromatic groups, aliphatic groups, cycloaliphatic groups, and mixtures thereof. Mixtures of isocyanates may also be used. However, using a mixture of isocyanates will lessen the predictability of the resulting chemical structure.

DETAILED DESCRIPTION OF THE INVENTION

The present invention is directed to water dispersible fluorinated polyurethanes and to methods of preparing the same. The water dispersible fluorinated polyurethanes are useful as base components in fluorinated polyurethane coating compositions. The resulting coating compositions are useful for aerospace and other applications.

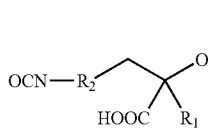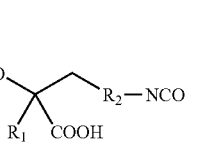

(5)

The acid-functional, isocyanate-terminated compound (5) is then reacted with at least one polyol to form a high molecular weight, acid- and hydroxyl-functional polyurethane compound represented by the formula (6). In one embodiment, the polyol is represented by HO—$R_3$—OH, where $R_3$ is a polyether group, polyester group, acrylic group, or polyurethane group. Mixtures of polyols may also be used. However, using a mixture of polyols will lessen the predictability of the resulting chemical structure.

In one embodiment, a water-dispersible fluorinated polyurethane is prepared by a "split process" involving first reacting a hydroxypolyalkylenoxy derivative of a perfluoropolyoxyalkane with isocyanate. The term "split process" refers to the separate reaction steps in the inventive methods. While the conventional batch process involves reacting all reactants simultaneously, the split process of the present invention reacts the reactants in a step-wise fashion.

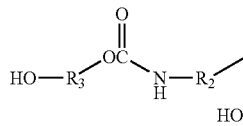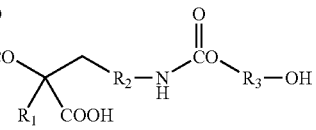

(6)

Finally, the high molecular weight, acid- and hydroxyl-functional polyurethane compound (6) is neutralized with a tertiary amine to form a fluorinated polyurethane represented by the formula (7). The tertiary amine is represented by $NR'_3$.

The split process involves first reacting a hydroxypolyalkylenoxy derivative of a perfluoropolyoxyalkane with a first isocyanate to produce an isocyanate-terminated compound. The isocyanate-terminated compound is then reacted with an

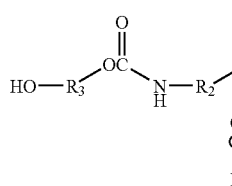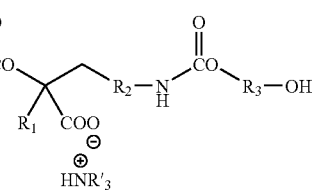

(7)

emulsifier to produce an acid- and hydroxyl-functional compound. The acid- and hydroxyl-functional compound is then reacted with a second isocyanate to form an acid-functional, isocyanate-terminated compound. The acid-functional, isocyanate-terminated compound is then reacted with at least one polyol to produce a high molecular weight, acid- and hydroxyl-functional compound. Finally, the acid functional groups of the high molecular weight, acid- and hydroxyl-functional compound are neutralized to form a fluoro-urethane salt compound which is dispersed in water. The inventive fluorinated polyurethanes may be used to prepare polyurethane coating compositions.

According to one embodiment, the hydroxypolyalkylenoxy derivative of the perfluoropolyoxyalkane starting material is a hydroxypolyethylenoxy derivative of a perfluoropolyoxyalkane and may be represented by the formula (1).

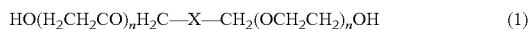
(1)

In Formula 1, n is any rational number, for example from 1 to 10, and X is represented by the formula 1A. In one embodiment, for example, n ranges from 1 to 5. In another embodiment, n ranges from 1 to 3

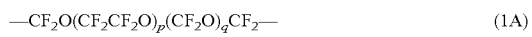
(1A)

In Formula 2, p and q are rational numbers, the sum of which (p+q) ranges from 10 to 180. In addition, the ratio of p/q ranges from 0.5 to 2. Nonlimiting examples of suitable starting materials satisfying formulae 1 and 1A include polymer modifiers such as Fluorolink E, Fluorolink E10 and Fluorolink E10-H commercially available from Solvay Solexis, Inc.

Despite the hydrophilic end groups of the starting material represented by formulae 1 and 1A, the starting compound is extremely hydrophobic and has a relatively low molecular weight. These properties make the compound represented by formulae 1 and 1A a bad candidate for combination with water-dispersible isocyanate to form a polyurethane coating composition. Accordingly, one method of the present invention includes first reacting the starting material represented by formula 1 with a first isocyanate. In one embodiment, the first isocyanate reactant is a diisocyanate represented by OCN—R—NCO, in which R may be selected from any suitable aromatic groups, aliphatic groups, cycloaliphatic groups, and mixtures thereof. However, any isocyanate known and used in the polyurethane coating composition field may be used as the first isocyanate in this reaction. Although diisocyanate may be used, isocyanates of higher functionality are also suitable. Nonlimiting examples of suitable isocyanates for the first isocyanate include isophorone diisocyanate, cycloaliphatic diisocyanates (such as those commercially available under the trade name Desmodur-W from Bayer Material Science), hexamethylene diisocyanate (HDI) and tetramethylxylylene diisocyanate (TMXDI). More nonlimiting examples of suitable isocyanates are disclosed in U.S. Pat. No. 4,913,972, the entire content of which is incorporated herein by reference. Mixtures of isocyanates may also be used. However, using a mixture of isocyanates will lessen the predictability of the resulting chemical structure. The resulting product is an isocyanate-terminated compound represented by the formula (2).

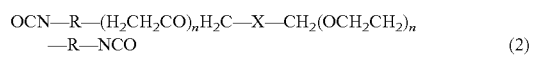
(2)

In Formula 2, n and X are the same as in Formula 1.

After reacting the hydroxypolyalkylenoxy derivative of a perfluoropolyoxyalkane (1) with a first isocyanate to produce the isocyanate-terminated compound (2), the isocyanate-terminated compound (2) is reacted with an emulsifier to produce an acid- and hydroxyl-functional compound. The emulsifier is selected from dialkylol propionic acids which are represented by the formula (3A).

(3A)

In the emulsifier (3A), $R_1$ may be any alkyl group. In one embodiment, $R_1$ is selected from methyl groups (as shown in the formula (3B) below) and ethyl groups (as shown in the formula (3C) below). Accordingly, nonlimiting examples of suitable emulsifiers for use in this reaction include dimethylolbutyric acid (in which $R_1$ is a methyl group) and diethylolpropionic acid (in which $R_1$ is an ethyl group). Mixtures of emulsifiers may also be used. However, using a mixture of emulsifiers will lessen the predictability of the resulting chemical structure.

(3B)

(3C)

The isocyanate groups (NCO groups) of the isocyanate-terminate compound (2) are highly reactive and would normally react with both the hydroxyl and carboxyl groups of an emulsifier. However, in the present invention, reaction with the carboxyl group of the emulsifier is sterically hindered by the presence of an alkyl group (i.e., $CH_3$ in formula (3B), and $C_2H_5$ in formula (3C)). Accordingly, the isocyanate groups of the isocyanate-terminated compound (2) selectively react with the hydroxyl end groups of the emulsifier (3A) to produce a compound terminated with emulsifier moieties which have both acid and hydroxyl functionalities. The resulting compound is an acid- and hydroxyl-functional compound represented by the formula (4).

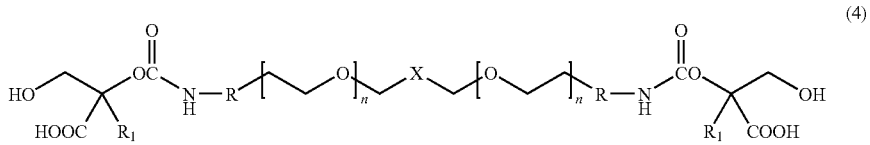

(4)

In the acid- and hydroxyl-functional compound (4), X and n are the same as in the hydroxypolyalkylenoxy derivative of a perfluoropolyoxyalkane (1), and R and $R_1$ are as described above with respect to the isocyanate reactant and the emulsifier (3A).

While the reaction of the isocyanate-terminated compound (2) with the emulsifier (3A) provides acid and hydroxyl functionality, the resulting acid- and hydroxyl-functional compound (4) has low molecular weight and is desirably further reacted to build molecular weight. To further react the acid- and hydroxyl-functional compound (4), the method further comprises replacing the hydroxyl end groups with isocyanate end groups to increase reactivity. Accordingly, the acid- and hydroxyl-functional compound (4) is reacted with a second isocyanate (which may be the same as or different from the first isocyanate) to produce an isocyanate-terminated compound represented by the formula (5).

Although diisocyanates may be used, multifunctional isocyanates are also suitable. Nonlimiting examples of suitable isocyanates for the second isocyanate include those mentioned earlier with respect to the first isocyanate.

The isocyanate-terminated compound (5) is then reacted with one or more polyols to build molecular weight and terminate the compound with hydroxyl groups. The polyol may be any suitable polyol known and used in polyurethane coating compositions. In one embodiment, the polyol may be represented by HO—$R_3$—OH, in which $R_3$ may be any polyether group, polyester group, acrylic group or polyurethane group. That is, the polyol may be any polyether polyol, polyester polyol, polyurethane polyol, or acrylic polyol. Nonlim-

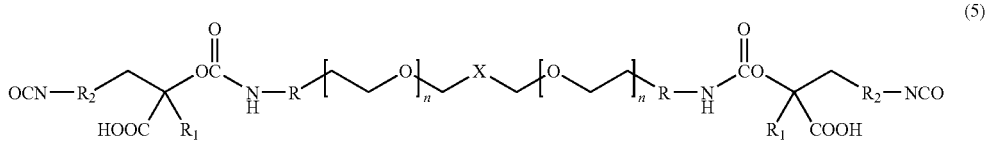

(5)

In one embodiment, the second isocyanate reactant is a diisocyanate represented by OCN—$R_2$—NCO, in which $R_2$ (like R in the first isocyanate reactant, described above) may be selected from any suitable aromatic groups, aliphatic groups, cycloaliphatic groups, and mixtures thereof. However, any isocyanate known and used in polyurethane coating compositions may be used as the second isocyanate in this reaction.

iting examples of suitable polyols include the organic polyols discussed in U.S. Pat. No. 4,913,972, the entire content of which is incorporated herein by reference. Mixtures of polyols may also be used. However, using a mixture of polyols will lessen the predictability of the resulting chemical structure. The hydroxyl-terminated product resulting from this reaction is represented by formula (6).

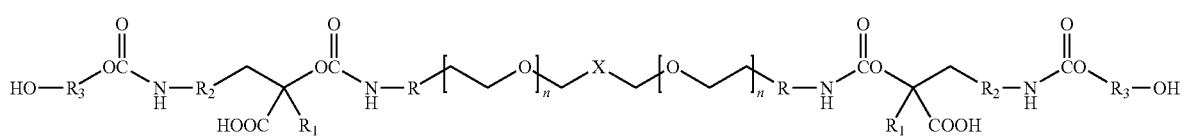

(6)

In the hydroxyl-terminated compound (6), n, R, $R_1$ and $R_2$ are as described above with respect to the hydroxypolyalkylenoxy derivative of a perfluoropolyoxyalkane (1), the first and second isocyanate reactants and the emulsifier (3A).

The hydroxyl-terminated compound (6) is then reacted with a tertiary amine to neutralize at least some of the carboxyl groups present in compound (6). The tertiary amine is represented by $NR'_3$. One nonlimiting example of a suitable tertiary amine is triethyl amine. Reaction of the hydroxyl-terminated compound (6) with the tertiary amine yields a fluoro-urethane salt represented by formula (7).

in which order. Consequently, the order of the monomers in the resulting polymer chain is impossible to predict.

In contrast, the fluorinated polyurethanes of the present invention are often prepared by a split process in which each reactant has only one possible reaction site. Specifically, in the first step of the process, the isocyanate can only react with the OH groups of the hydroxypolyalkylenoxy derivative of the perfluoropolyoxyalkane (1). Accordingly, the resulting chemical structure at each step of the split process is controllable.

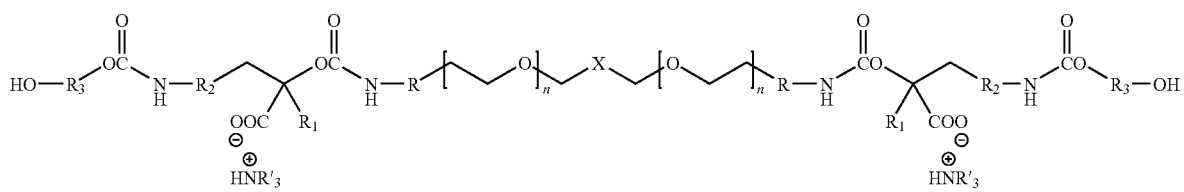

(7)

Once the hydroxyl-terminated compound is neutralized to form the fluoro-urethane salt (7), the salt is dispersed in water. When dispersed in water, the compound forms micelles in the water. The water-dispersed fluoro-urethane salt compound may then be reacted with water-dispersible isocyanate to form a polyurethane coating composition for application to a substrate.

Alternatively, if higher molecular weight is desired, prior to dispersion in water, the fluoro-urethane salt compound (7) may be further chain-extended with additional diisocyanates to achieve higher molecular weight. When the desired molecular weight is achieved, the isocyanate-terminated compound may then be reacted with additional polyols to yield a hydroxyl-terminated compound, which is then dispersed in water.

Unlike in conventional coating compositions prepared using the batch process, the inventive fluoro-compounds are stable when stored in water. The fluoro-compounds remain dispersed and do not phase separate after dispersion in water. In contrast, in conventional coating compositions made from fluorinated diols subjected to the batch process, the fluorinated diol phase separates shortly after dispersion in water. Accordingly, unlike conventional coating compositions, the fluoro-compounds of the present invention retain the benefits imparted by the fluorine atoms protecting the carbon backbone of the polymer.

In addition to retaining the benefits imparted by the fluorine atoms, the fluorinated polyurethanes of the present invention have controllable chemical structures. The conventional batch process of preparing high molecular weight fluorinated pre-polymers for use in coating compositions yields an unlimited number of possible chemical structures for the resulting pre-polymer. In the batch process, all hydroxyl-containing reactants are reacted simultaneously with the isocyanate, providing the isocyanate groups numerous OH groups with which to react, and resulting in a random distribution of monomers in the resulting polymer. In particular, in the batch process, the functional diol, emulsifier, polyol and any other OH-containing reactants react with the isocyanate simultaneously. Because the isocyanate can react with any OH group, and because the fluorinated diol, emulsifier and polyol each have multiple OH groups, it is impossible to determine with which OH group the isocyanate will react and Moreover, the conventional batch process yields a very low amount of the desired fluorinated pre-polymer. Because the batch process provides the isocyanate numerous reaction sites, the isocyanate will react more readily with the emulsifier and any other OH-containing species rather than the hydrophobic fluorinated polyol. In contrast, the hydroxypolyalkylenoxy derivative of a perfluoropolyoxyalkane (1) includes hydrophilic end groups making the compound more friendly to reaction with isocyanate. In addition, the split process provides the isocyanate with only one reaction site option, thereby increasing the reactivity of the isocyanate with the fluorinated starting material.

To make a polyurethane coating composition for application to a substrate, the water-dispersed, hydroxyl-terminated fluorinated polyurethane (7) is used as a base component, and a water-dispersible isocyanate is used as an activator component. The base component including the water-dispersed, hydroxyl-terminated fluorinated polyurethane (7) is reacted with the water-dispersible isocyanate activator component. The water-dispersible isocyanate may be any suitable aromatic, aliphatic or cycloaliphatic isocyanate. Any known water-dispersible isocyanates may be used as the water-dispersible isocyanate activator component. Nonlimiting examples of suitable water-dispersible isocyanates include trimer- and allophanate-based polyisocyanates manufactured from isophorone diisocyanate (IPDI) and hexamethylene diisocyanate (HDI), polyisocyanates prepared from aminosulfonic acid modified chemistry, and blocked polyisocyanates prepared from HDI or cyclohexylmethane diisocyanate ($H_{12}MDI$).

Nonlimiting examples of suitable trimer- and allophanate-based diisocyanates include Bayhydur 302, Bayhydur 303, Bayhydur 304 (formerly Bayhydur VP LS 2319), Bayhydur 305 (formerly Bayhydur VP LS 2336), Bayhydur 401-70 (formerly Bayhydur VP LS 2150/1), Bayhydur VP LS 2150BA, Bayhydur 3100 and Bayhydur XP-7165, all available from Bayer Corporation. The properties of each of these exemplary water-dispersible isocyanates are reported in Table 1 below. In Table 1, "% NCO" refers to isocyanate concentration, "Equiv weight" refers to equivalent weight, "NCO funct" refers to isocyanate functionality, "HM" means hydrophilically modified, and "AMT" means allophanate modified trimer.

TABLE 1

|  | % NCO | Equiv Weight | Viscosity (mPa·s) | NCO funct | Solids Content | Type of Isocyanate |
|---|---|---|---|---|---|---|
| Bayhydur 302 | 17.3 ± 0.5 | 242.70 | 2300 ± 700 | 3.3 | 99.80% | HM HDI trimer |
| Bayhydur 303 | 19.3 ± 0.5 | 271.60 | 2400 ± 800 | 3.4 | 100% | HM HDI trimer |
| Bayhydur 304 | 18.0 ± 0.5 | 233.30 | 4500 ± 1500 | 3.8 | 100% | HM HDI AMT |
| Bayhydur 305 | 16.2 ± 0.5 | 259.20 | 6800 ± 600 | 3.8 | 100% | HM IPDI AMT |
| Bayhydur 401-70 | 9.4 ± 0.5 | 446.80 | 600 ± 200 | 3.0 | 70% ± 2 | HM IPDI trimer |
| Bayhydur VP LS 2150BA | 9.4 ± 0.5 | 446.80 | 500 ± 200 | 3.0 | 70% ± 2 | HM IPDI trimer |
| Bayhydur 3100 | 17.4 ± 0.5 | 241.40 | 3300 ± 600 | 3.2 | 100% | HDI standard |
| Bayhydur XP-7165 | 18.4 ± 0.5 | 228.30 | 1100 ± 200 | 3.0 | 100% | HM HDI trimer |

Nonlimiting examples of suitable polyisocyanates prepared from aminosulfonic acid modified chemistry include Bayhydur XP 2547, Bayhydur 2487/1, and Bayhydur 2655, all available from Bayer Corporation. The properties of each of these exemplary water-dispersible isocyanates are reported in Table 2 below. In Table 2, "% NCO" refers to isocyanate concentration, "Equiv weight" refers to equivalent weight, and "NCO funct" refers to isocyanate functionality.

TABLE 2

|  | % NCO | Equiv Weight | Viscosity (mPa·s) | NCO Funct | Solids Content |
|---|---|---|---|---|---|
| Bayhydur XP 2547 | 23.0 ± 0.5 | 182.60 | 600 ± 200 | 3.0 | 100% |
| Bayhydur 2487/1 | 20.5 ± 0.5 | 204.90 | 6000 ± 600 | 3.4 | 100% |
| Bayhydur 2655 | 21.2 ± 0.5 | 198.10 | 3500 ± 1000 | 3.2 | 100% |

Nonlimiting examples of suitable blocked polyisocyanates prepared from hexamethylene diisocyanate (HDI) or cyclohexylmethane diisocyanate ($H_{12}MDI$) include Bayhydur VP LS 2240 and Bayhydur VP LS 2310, both available from Bayer Corporation. The properties of each of these exemplary water-dispersible isocyanates are reported in Table 3 below. In Table 3, "% NCO" refers to isocyanate concentration, "Equiv weight" refers to equivalent weight, and "NCO funct" refers to isocyanate functionality.

TABLE 3

|  | % NCO | Equiv Weight | Viscosity (mPa·s) | Type of isocyanate | Solids content |
|---|---|---|---|---|---|
| Bayhydur VP LS 2240 | 2.5 | 1680 | 20 seconds* | $H_{12}MDI$ | 35.0% ± 2.0 |
| Bayhydur VP LS 2310 | N/A | N/A | 3000-10,000 | HDI | 37.5 ± 1.0 |

*Due to the low viscosity, the value can only be reported in seconds.

The coating composition may further include conventional additives for coating compositions, such as pigments, fillers, UV absorbers, flow aids, and rheology control agents. The coating composition may also include a catalyst. Although conventional coating compositions prepared using the batch process and including catalysts have very short shelf lives of only about three to six months, the use of catalysts in the inventive split process does not have an adverse effect on shelf life. The coating compositions of the present invention, prepared by the inventive split process and using catalysts have much longer shelf lives, typically about one to two years.

The term "pigment" includes fillers and extenders as well as conventional pigments. Pigments are particulate materials which impart color or opacity to the final coating composition. Extenders and fillers are usually inorganic materials which can be used to reduce the cost of a formulation or to modify its properties. Nonlimiting examples of suitable pigments include carbon black, titanium dioxide, magnesium sulfate, calcium carbonate, ferric oxide, aluminum silicate, barium sulfate, and color pigments. When used, the pigments can be present in an amount ranging from about 10 to 50 weight percent based on the total solids weight of the coating composition. For example, the pigments and fillers may be present in an amount ranging from about 20 to 40 weight percent based on the total solids weight of the coating composition.

The polyurethane coating composition is, in certain embodiments, a "two-component system," i.e., the water-dispersed, hydroxyl-terminated fluorinated polyurethane base component including any additives and pigments is stored separately from the water-dispersible isocyanate activator component. The individual components are maintained separately until shortly prior to application, when the two components are mixed, allowed to react, and then applied to the intended substrate. Cross-linking takes place after application on the substrate, and after evaporation of any solvent and water in the composition.

The coating compositions of the present invention can be applied using any suitable coating method, such as by brushing, spraying, dipping, rolling, flowing, and the like. Also, the coating compositions can be applied to any suitable dry film thickness. For example, in certain embodiments, the coating composition is applied to a dry film thickness ranging from about 1 mm to 6 mm. In one embodiment, the coating composition is applied to a dry film thickness ranging from about 2 mm to 4 mm.

The coating compositions of the present invention may be applied on a primer and may be used as a topcoat, basecoat or clearcoat. Alternatively, the coating compositions may be used as a one-coat system, eliminating the need for a separate topcoat, basecoat and/or clearcoat.

The present invention has been described with reference to exemplary embodiments and aspects, but is not limited thereto. Persons skilled in the art will appreciate that other modifications and applications can be made without meaningfully departing from the invention. For example, although the coating compositions are described as being useful for aerospace applications, they may be useful for other applications as well. Also, while certain exemplary polyols and isocyanates are listed as suitable for the particular reactions, other suitable polyols and isocyanates may also be used. Accordingly, the foregoing description should not be read as limited to the precise embodiments and aspects described, but should be read consistent with and as support for the following claims, which are to have their fullest and fairest scope.

What is claimed is:

1. A method of, preparing a fluorinated polyurethane, comprising:
   (a) reacting a hydroxypolyalkylenoxy derivative of a perfluoropolyoxyalkane with a first isocyanate to produce an isocyanate-terminated compound;
   (b) reacting the isocyanate-terminated compound with an emulsifier to produce an acid- and hydroxyl-functional compound;
   (c) reacting the acid- and hydroxyl-functional compound with a second isocyanate to form an acid-functional, isocyanate-terminated compound;
   (d) reacting the acid-functional, isocyanate-terminated compound with at least one polyol to produce an acid- and hydroxyl-functional compound of higher molecular weight than the acid- and hydroxyl-functional compound produced in (b); and
   (e) neutralizing acid functional groups of the high molecular weight, acid- and hydroxyl-functional compound to form a fluorinated polyurethane.

2. The method according to claim 1, wherein the isocyanate-terminated compound is represented by formula (2):

$$\text{OCN—R—NHCOO—}(CH_2CH_2O)_n CH_2\text{—X—}CH_2(OCH_2CH_2)_n\text{—OOCNH—R—NCO} \quad (2)$$

wherein X is represented by formula (1A)

$$\text{—}CF_2O(CF_2CF_2O)_p(CF_2O)_qCF_2\text{—} \quad (1A)$$

wherein n is a rational number ranging from 1 to 10, p and q are rational numbers satisfying $10 \leq (p+q) \leq 180$ and $0.5 \leq (p/q) \leq 2$, and R is selected from the group consisting of aliphatic groups, cycloaliphatic groups, aromatic groups, and mixtures thereof.

3. The method of claim 1, further comprising dispersing the fluorinated polyurethane in water.

4. The method according to claim 2, wherein the hydroxypolyalkylenoxy derivative of a perfluoropolyoxyalkane is represented by formula (1):

$$\text{HO}(CH_2CH_2O)_n CH_2\text{—X—}CH_2(OCH_2CH_2)_n OH \quad (1)$$

wherein X is represented by formula (1A)

$$\text{—}CF_2O(CF_2CF_2O)_p(CF_2O)_qCF_2\text{—} \quad (1A)$$

wherein n is a rational number ranging from 1 to 10, and p and q are rational numbers satisfying $10 \leq (p+q) \leq 180$ and $0.5 \leq (p/q) \leq 2$.

5. The method according to claim 1, wherein the acid- and hydroxyl-functional compound is represented by formula (4):

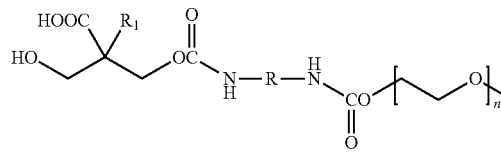

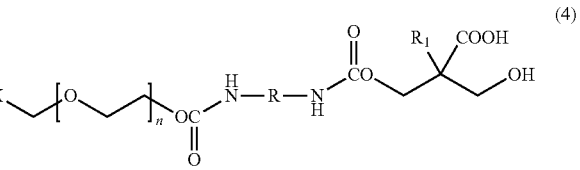

wherein X is represented by formula (1A)

$$\text{—}CF_2O(CF_2CF_2O)_p(CF_2O)_qCF_2\text{—} \quad (1A)$$

wherein n is a rational number ranging from 1 to 10, p and q are rational numbers satisfying $10 \leq (p+q) \leq 180$ and $0.5 \leq (p/q)_2$, $R_1$ is an alkyl group, and R is selected from the group consisting of aliphatic groups, cycloaliphatic groups, aromatic groups, and mixtures thereof.

6. The method according to claim 1, wherein the acid-functional, isocyanate-terminated compound is represented by formula (5):

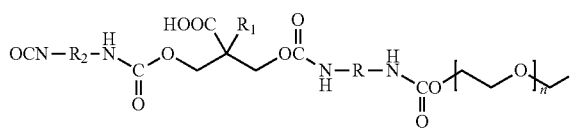

wherein X is represented by formula (1A)

$$\text{—}CF_2O(CF_2CF_2O)_p(CF_2O)_qCF_2\text{—} \quad (1A)$$

wherein n is a rational number ranging from 1 to 10, and p and q are rational numbers satisfying $10 \leq (p+q) \leq 180$ and $0.5 \leq (p/q)_2$, and wherein:

R and $R_2$ are independently selected from the group consisting of aliphatic groups, cycloaliphatic groups, aromatic groups, and mixtures thereof, and $R_1$ is an alkyl group.

7. The method according to claim 1, wherein the fluorinated polyurethane is represented by formula 7:

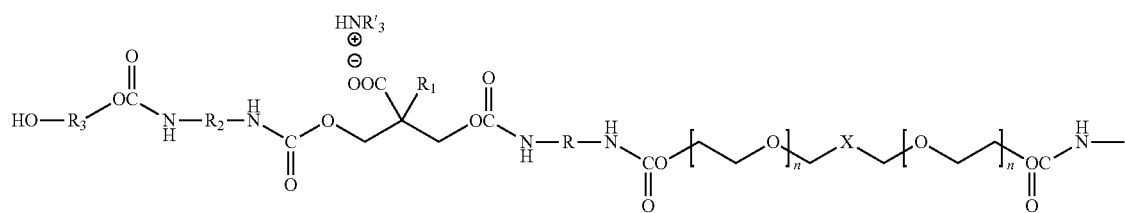

(7)

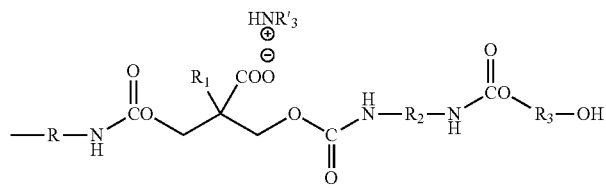

wherein X is represented by formula (1A)

$$-CF_2O(CF_2CF_2O)_p(CF_2O)_qCF_2- \quad (1A)$$

wherein n is a rational number ranging from 1 to 10, and p and q are rational numbers satisfying $10 \leq (p+q) \leq 180$ and $0.5 \leq (p/q) \leq 2$; and wherein:
- R and $R_2$ are independently selected from the group consisting of aliphatic groups, cycloaliphatic groups, aromatic groups, and mixtures thereof,
- $R_1$ is an alkyl group,
- $R_3$ is selected from the group consisting of polyether groups, polyester groups, polyurethane groups and acrylic groups, and

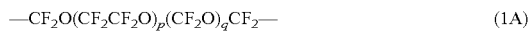

is a quaternary ammonium ion.

wherein n is a rational number ranging from 1 to 10, and X is represented by formula (1A)

$$-CF_2O(CF_2CF_2O)_p(CF_2O)_qCF_2- \quad (1A)$$

wherein p and q are rational numbers satisfying $10 \leq (p+q) \leq 180$ and $0.5 \leq (p/q) \leq 2$;

$$OCN-R-NHCOO-(CH_2CH_2O)_nCH_2-X-CH_2 \\ (OCH_2CH_2)_n-OOCNH-R-NCO \quad (2)$$

wherein R is selected from the group consisting of aliphatic groups, cycloaliphatic groups, aromatic groups, and mixtures thereof;

(b) reacting the compound represented by formula (2) with an emulsifier to form a compound represented by formula (4)

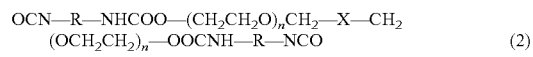

wherein $R_1$ is an alkyl group;

(c) reacting the compound represented by formula (4) with a second isocyanate to form a compound represented by formula (5)

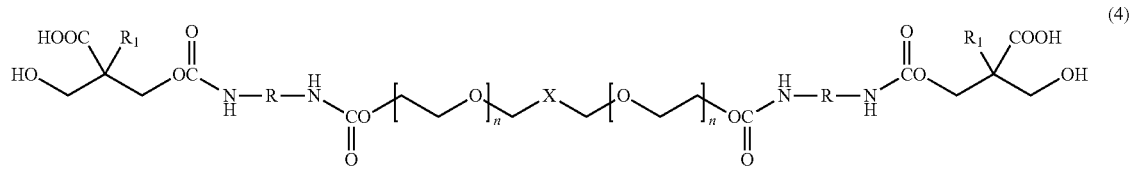

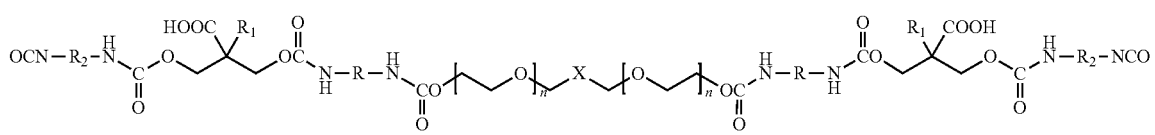

8. A method of preparing a fluorinated polyurethane, comprising:
(a) reacting a compound represented by formula (1) with a first isocyanate to form a compound represented by formula (2)

$$HO(CH_2CH_2O)_nCH_2-X-CH_2(OCH_2CH_2)_nOH \quad (1)$$

wherein $R_2$ is selected from the group consisting of aliphatic groups, cycloaliphatic groups, aromatic groups, and mixtures thereof;

(d) reacting the compound represented by formula (5) with at least one polyol to form a compound represented by formula (6)

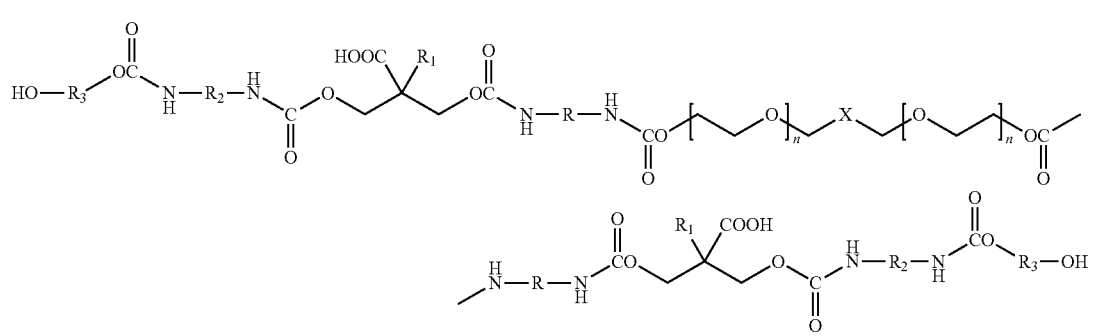

(6)

wherein R₃ is selected from the group consisting of polyether groups, polyester groups, polyurethane groups and acrylic groups; and (e) neutralizing the compound represented by formula (6) with a tertiary amine to form a fluorinated polyurethane represented by formula (7), wherein the tertiary amine is represented by NR'₃

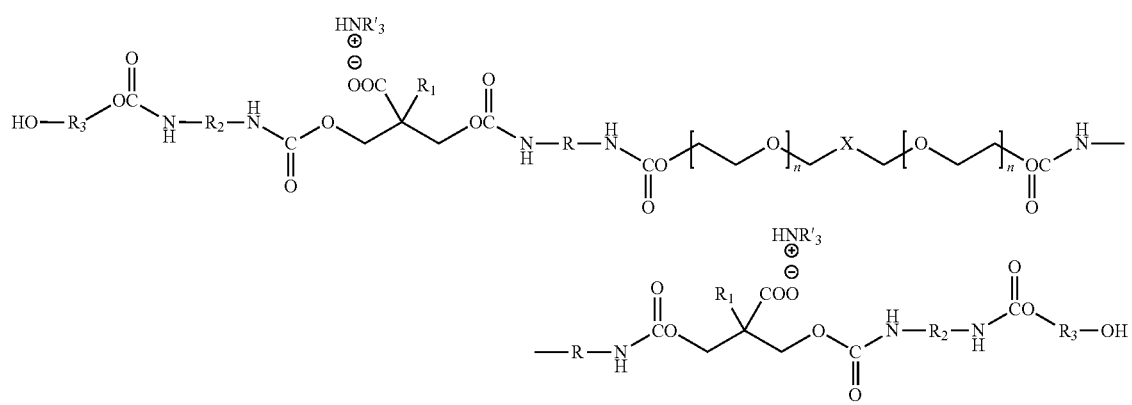

(7)

wherein

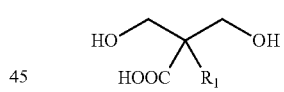

is a quaternary ammonium ion.

9. The method according to claim 8, wherein the first and second isocyanates are independently selected from the group consisting of isophorone diisocyanate, cycloaliphatic diisocyanates, hexamethylene diisocyanate, tetramethylxylyene diisocyanate, and combinations thereof.

10. The method according to claim 8, wherein the emulsifier is represented by formula (3A):

$$\text{HO} \diagdown \text{OH} \atop \text{HOOC} \quad R_1$$

(3A)

wherein R₁ is an alkyl group.

11. The method according to claim 8, wherein the emulsifier is dimethylolbutyric acid.

12. A fluorinated polyurethane comprising a compound represented by formula (7):

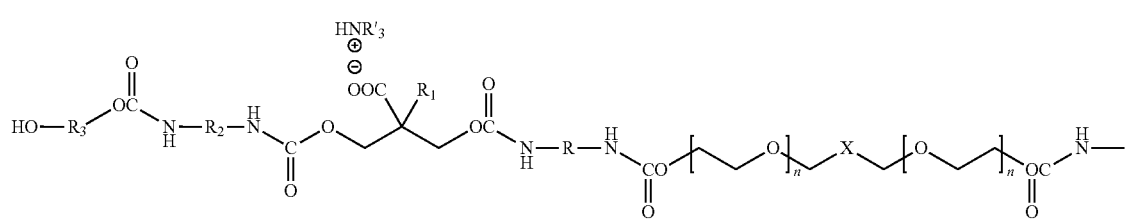

(7)

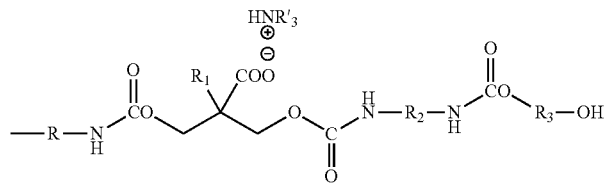

wherein:

n is a rational number ranging from 1 to 10, each of R and $R_2$ is independently selected from the group consisting of aliphatic groups, cycloaliphatic groups, aromatic groups, and mixtures thereof, blocked polyisocyanates prepared from HDI, and blocked polyisocyanates prepared from cyclohexylmethane diisocyanate ($H_{12}$MDI).

16. A polyurethane coating composition comprising:

a base component comprising a compound represented by formula (7) dispersed in water (7)

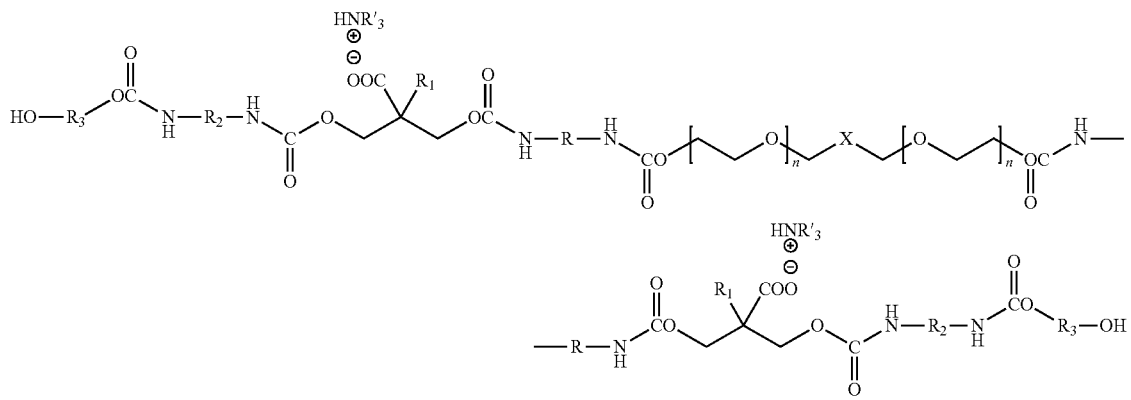

$R_1$ is an alkyl group, $R_3$ is selected from the group consisting of polyether groups, polyester groups, polyurethane groups, and acrylic groups, $H\overset{\oplus}{N}R'_3$ is a quaternary ammonium ion, and X is represented by formula (1A)

$$—CF_2O(CF_2CF_2O)_p(CF_2O)_qCF_2—\quad (1A)$$

wherein p and q are rational numbers satisfying $10 \leq (p+q) \leq 180$ and $0.5 \leq (p/q) \leq 2$.

13. The fluorinated polyurethane according to claim 12, wherein the compound represented by formula (7) is dispersed in water.

14. A polyurethane coating composition comprising:

a base component comprising the fluorinated polyurethane according to claim 13; and an activator component comprising at least one water-dispersible isocyanate.

15. The polyurethane coating composition according to claim 14, wherein the water-dispersible isocyanate is selected from the group consisting of trimer- and allophanate-based polyisocyanates manufactured from isophorone diisocyanate (IPDI), trimer- and allophanate-based polyisocyanates manufactured from hexamethylene diisocyanate (HDI), polyisocyanates prepared from aminosulfonic acid modified chemistry, wherein:

n is a rational number ranging from 1 to 10, each of R and $R_2$ is independently selected from the group consisting of aliphatic groups, cycloaliphatic groups, aromatic groups, and mixtures thereof, $R_1$ is an alkyl group, $R_3$ is selected from the group consisting of polyether groups, polyester groups, polyurethane groups, and acrylic groups, $H\overset{\oplus}{N}R'_3$ is a quaternary ammonium ion, and X is represented by Formula 1A $$—CF_2O(CF_2CF_2O)_p(CF_2O)_qCF_2—\quad (1A)$$

wherein p and q are rational numbers satisfying $10 \leq (p+q) \leq 180$ and $0.5 \leq (p/q) \leq 2$; and an activator component comprising at least one water-dispersible isocyanate.

17. The polyurethane coating composition according to claim 16, wherein the water-dispersible isocyanate is selected from the group consisting of trimer- and allophanate-based polyisocyanates manufactured from isophorone diisocyanate (IPDI), trimer- and allophanate-based polyisocyanates manufactured from hexamethylene diisocyanate (HDI), polyisocyanates prepared from aminosulfonic acid modified chemistry, blocked polyisocyanates prepared from HDI, and blocked polyisocyanates prepared from cyclohexylmethane diisocyanate ($H_{12}$MDI).

18. The method according to claim 1, wherein the acid- and hydroxyl-functional compound produced in (d) is represented by formula (6):

(6)

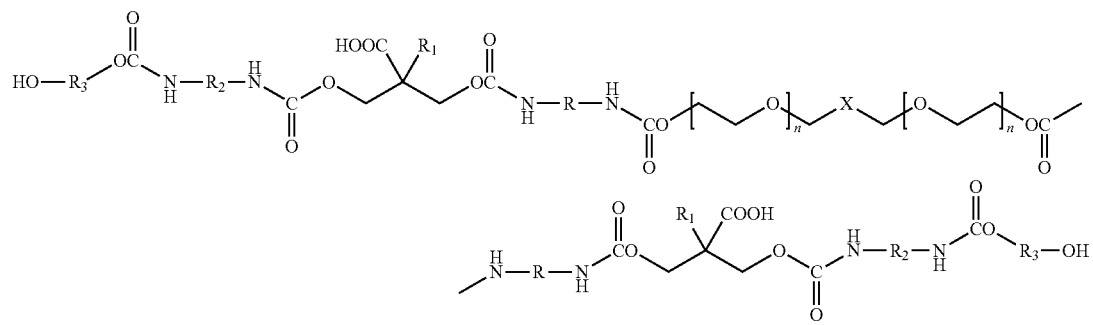

wherein X is represented by formula (1A)

wherein n is a rational number ranging from 1 to 10, and p and q are rational numbers satisfying $10 \leq (p+q) \leq 180$ and $0.5 \leq (p/q) \leq 2$; and wherein:
R and $R_2$ are independently selected from the group consisting of aliphatic groups, cycloaliphatic groups, aromatic groups, and mixtures thereof,
$R_1$ is an alkyl group, and
$R_3$ is selected from the group consisting of polyether groups, polyester groups, polyurethane groups and acrylic groups.

* * * * *